US007925637B2

(12) United States Patent
Ma et al.

(10) Patent No.: US 7,925,637 B2
(45) Date of Patent: Apr. 12, 2011

(54) SYSTEM AND METHOD FOR AUTOMATICALLY REFINING ONTOLOGY WITHIN SPECIFIC CONTEXT

(75) Inventors: Li Ma, Beijing (CN); Yue Pan, Beijing (CN); Chen Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 11/853,852

(22) Filed: Sep. 12, 2007

(65) Prior Publication Data

US 2008/0071731 A1     Mar. 20, 2008

(30) Foreign Application Priority Data

Sep. 14, 2006 (CN) .......................... 2006 1 0153706

(51) Int. Cl.
G06F 7/00 (2006.01)
G06F 17/00 (2006.01)
(52) U.S. Cl. ...................................... 707/690; 707/692
(58) Field of Classification Search ............... 707/104.1, 707/1, 102, 103 R, 690, 692
See application file for complete search history.

(56) References Cited

U.S. PATENT DOCUMENTS

| | | | |
|---|---|---|---|
| 5,694,523 A | 12/1997 | Wical | |
| 5,732,090 A | 3/1998 | Mio | |
| 6,405,162 B1 | 6/2002 | Segond et al. | |
| 6,564,263 B1 | 5/2003 | Bergman et al. | |
| 6,640,231 B1 | 10/2003 | Andersen et al. | |
| 6,691,151 B1 | 2/2004 | Cheyer et al. | |
| 6,732,090 B2 | 5/2004 | Shananhan et al. | |
| 6,789,252 B1 | 9/2004 | Burke et al. | |
| 6,850,944 B1 | 2/2005 | MacCall et al. | |
| 6,873,994 B2* | 3/2005 | Kootale | 707/690 |
| 7,099,885 B2* | 8/2006 | Hellman et al. | 707/103 R |
| 7,254,589 B2* | 8/2007 | Goodwin et al. | 707/104.1 |
| 7,324,999 B2* | 1/2008 | Judd | 707/690 |
| 7,328,209 B2* | 2/2008 | Das et al. | 1/1 |
| 7,383,260 B2 | 6/2008 | Smith et al. | |
| 7,769,727 B2* | 8/2010 | Sivapragasam et al. | 707/690 |
| 2004/0054690 A1* | 3/2004 | Hillerbrand et al. | 707/104.1 |
| 2004/0083199 A1* | 4/2004 | Govindugari et al. | 707/1 |
| 2004/0093344 A1* | 5/2004 | Berger et al. | 707/102 |
| 2004/0117346 A1* | 6/2004 | Stoffel et al. | 707/1 |

(Continued)

OTHER PUBLICATIONS

Ram et al. "Semantic Conflict Resolution Ontology (SCROL): An Ontology for Detecting and Resolving Data and Schema-Level Semantic Conflicts"; Feb. 2004; IEEE Transactions on Knowledge and Data Engineering; vol. 16 No. 2; pp. 189-202.*

(Continued)

*Primary Examiner* — Yicun Wu
*Assistant Examiner* — Pavan Mamillapalli
(74) *Attorney, Agent, or Firm* — George R. McGuire; David B. Woycechowsky; Bond Schoeneck & King, PLLC

(57) ABSTRACT

The present invention provides a system and method for automatically refining ontology within a specific context. The system comprises: a rich context extractor for discovering a semantics relationship conflict existing between an original ontology schema and application data; and an ontology schema and mapping refiner for refining the original ontology schema based on the semantics relationship conflict discovered by the rich context extractor, and creating a new mapping between the refined ontology schema and a data schema of the application data. According to the invention, users can save a lot of work of manual refinement, since the ontology schema is automatically refined based on contexts in the application data.

11 Claims, 8 Drawing Sheets

U.S. PATENT DOCUMENTS

| | | | |
|---|---|---|---|
| 2005/0262128 A1 | 11/2005 | Goodwin et al. | |
| 2006/0031217 A1 | 2/2006 | Smith et al. | |
| 2007/0038438 A1* | 2/2007 | Cho et al. | 704/9 |
| 2007/0198448 A1* | 8/2007 | Fokoue-Nkoutche et al. | 706/45 |
| 2007/0233627 A1* | 10/2007 | Dolby et al. | 706/45 |

OTHER PUBLICATIONS

Maedche et al. "Ontology Learning for the Semantic Web"; Mar.-Apr. 2001; IEEE Intelligent Systems; IEEE; pp. 72-79.*

Park et al. A Conflict Resolution Environment for Automation Mediation Among Heterogeneous Databases; Apr. 2001; Technical Report; University of Minnesota; Abstract p. & pp. 1-41.*

Ram et al. "Semantic-Model Support for Geographic Information Systems"; May 1999; Computer; vol. 32 No. 5; IEEE; p. 74-81.*

Beech et al. "The Cambridge Communique"; Oct. 1999; W3C; pp. 1-5.*

Goh et al. "Context Interchange: New Features and Formalisms for the Intelligent Integration of Information"; Jul. 1999; ACM Transactions on Information Systems; vol. 17 No. 3; p. 270-293.*

Ram et al. "Semantic Conflict Resolution Ontology (SCROL): An Ontology for Detecting and Resolving Data and Schema-Level Semantic Conflicts": Feb. 2004; IEEE Transactions on Knowledge and Data Engineering; vol. 16 No. 2; pp. 189-202.*

Beech et al. "The Cambridge Communique"; Oct. 1999; W3C; pp. 1-5.*

600/Research Disclosure, Mar. 2000; Use of Ontology in Question-Answering.

* cited by examiner

SYSTEM AND METHOD FOR AUTOMATICALLY REFINING ONTOLOGY WITHIN SPECIFIC CONTEXT

CROSS REFERENCE

The present application claims priority to Chinese Patent Application No. 200610153706.7, filed Sep. 14, 2006, the entirety of which is hereby incorporated by reference.

TECHNICAL FIELD

The present invention relates to the field of semantic technology and more particularly to ontology refinement based on the contexts in varieties of application data.

BACKGROUND OF THE INVENTION

With the rapid development of information technology, information integration has inevitably been one of important tasks. Moreover, "loosely coupled" information integration on heterogeneous data sources benefits enterprises by greatly reduced deployment cost and an ability to respond much more quickly to changing business requirements. To enable interoperability and integration of information systems, explicitly attaching the data with semantics has been a matter of common sense. Ontology, a hierarchically structured set of terms for describing a domain, is considered as the most efficient approach to impose semantics on data at present. In fact, W3C recently recommended Resource Description Framework (RDF) as a core data model and Web Ontology Language (OWL) as an ontology representation language for the Semantics Web.

Ontology schema such as a Resource Description Framework Schema (RDFS) is a kind of shared domain knowledge generalized by domain experts. Generally speaking, it could be widely applied into or populated by varieties of data in a certain application domain. For example, FIG. 1 shows a simple ontology example in the securities business. The upper part of the figure refers to ontology schema or RDFS in semantic web, which describes the terms used in the domain and hierarchical structure (or taxonomy) among them. The bottom part characterizes a general example, in which the data populates the ontology schema.

However, it is not guaranteed that the generalized ontology schema by domain experts might totally satisfy varieties of application requirements in a certain domain. Supposing that an application scenario needs to query the times of exchanging shares and the amount of money the trades involved, we would require different data from that in the above general example. FIG. 2 shows a conflict occurring between shared ontology schema and application data in the domain of securities business. There exist 3 independent transactions of exchanging share between a shareholder of "ID1" named "David Johnson" and a listed company of "ID2" titled with "IBM". Although each of the 3 transactions surely stands for a kind of "Shareholding" relationship owned by "ID 1", they can not populate the ontology schema with a complete context. The feature is intrinsic to ontology that it does only allow the classes defined in ontology schema to contain their properties. Therefore, a property itself can not be populated with varieties of data instances.

In order to clear the conflict between existing ontology schema and application data, e.g., the scenarios occurring between "ID1" and "ID2" in FIG. 2, only three ways would be intuitively considered.

The first way is totally ignore the ontology schema and fully rely on the data schemas There have been a few data integration tools to extract RDFS from data schemas from relational database, the eXtended Markup Language (XML), and so on. By them, we can completely extract ontology schemas from a database, which is perhaps very different from the well-known ones in the domain. A lot of limitations have been identified in this method. For example, the data schemas must be very well organized to suit to the application requirements for fear that redundant and faulty classes and properties are extracted. However, the demand is too rigid to be satisfied in most cases. Furthermore, those well-known ontology schemas have undergone severe training and hammering in the domains. Even when they can not fully cover all requirements in a certain application, it is still reasonable to continue using and extending them instead of replacing them.

The second is to ignore the detailed information like trading time and amount of money contained in data. By ignoring this detailed information, the data becomes compatible with existing ontology schema. We might do nothing but build the mapping between the property of "Shareholding" in ontology schema and the expression of join operations from the table storing shareholder information to the one recording listed company in a real system. No additional effort would be taken to clear the conflict. However, a few specific application requirements, e.g., querying the times of exchanging of shares, can not be supported by existing ontology schema.

Opposed to the above two ways, the third way is to rebuild or refine the ontology schema by enhancing the semantics with the detailed information. By enriching the ontology schema with specific features contained in application, a few already existing application requirements presented above, e.g., querying the times of exchanging of shares, could continue to be satisfied in ontology-based application environment.

FIG. 3 shows a refined ontology schema example by transforming the property of "Shareholding" into a class of "Transaction" which could contain properties like trading time and amount of money. In this example, semantic content in data populates the refined ontology schema without any loss. In accordance with the intrinsic feature of ontology illustrated above, each transaction relationship between "ID1" and "ID2" is referred to as an instance of a new class called "Transaction", and not subsumed within the property of "Shareholding" as in the older ontology schema. The property of "Shareholding" directing from "Shareholder" to "Listed Company" is transformed into a kind of indirect relationship in which a class serves to define the properties semantically contained in the relationship data. By this way, the query not supported by the second way might be conducted here.

The method of ontology schema refinement based on context, illustrated in FIG. 3, has been well known as the most intuitive and common way to resolve the problem (or "conflict") that occurs when the property defined as a relationship between two classes is too general to vividly characterize the varieties of semantics that the relationship-property contains. Unfortunately, most of the jobs applying these kinds of refinements are done by hand. Under the circumstance, whether the refined ontology schema is adequate for the application is determined by the knowledge and experience that users master. It is undoubtedly costly to reach the goal.

Besides the huge cost in design time, it is more difficult to monitor the inconsistency dynamically in runtime. With the evolving of the data, even the data schema is stable or with a little revision, the content will also possibly cause the changing of ontology schema. For example, all CEOs of a company are originally different in any two tenure of the office, therefore in the application, users can simply define a serving property to describe the relationship between a CEO and the company. However, since a certain time, a person who served as CEO of the company at past time has come back and still been entitled with CEO. The scenario does not hurt a data schema any more but do harm to ontology schema defined before. It must totally rely on a tool to automatically refine ontology in the runtime.

In order to save the costs, we expect to develop an intelligent agent to finish the job. Even while the automatically refined ontology schema is not the final one that users prefer to employ, it does not matter since most of features have been discovered. Users could design what they prefer only with minor revision on the automatically refined ontology schema. What the present invention prepares to solve is to automatically refine ontology schema based on a context hidden in data.

SUMMARY OF THE INVENTION

The present invention addresses the deficiencies of the art in respect to ontology refinement by hand, and provides a novel and non-obvious method and system to automatically refine ontology based on the contexts in varieties of application data.

According to the present invention, richer context than ontology schema to which the application data are mapped can be automatically discovered and further applied to the ontology itself to enhance its fitness for the application. The richer context (also referred to as "rich context" hereinafter) mainly refers to a relationship class hidden in data, which was marked as property of other class in the pre-existing ontology schema. After enriching the ontology by "upgrading" the property into a new relationship class, it can support varieties of application requirements involving the new class.

According to an aspect of the present invention, there is provided a system for automatically refining ontology within a specific context, comprising: a rich context extractor for discovering a semantics relationship conflict existing between an original ontology schema and application data; and an ontology schema and mapping refiner for refining the original ontology schema based on the semantics relationship conflict discovered by the rich context extractor, and creating a new mapping between the refined ontology schema and a data schema of the application data.

In an embodiment of the present invention, the rich context extractor discovers a conflict existing between the original ontology schema and the application data by extracting a relationship property having a conflict with a semantic relationship in the application data in the original ontology schema, and the ontology schema and mapping refiner refines the original ontology schema by transforming the relationship property having the conflict extracted by the rich context extractor into a new relationship class.

In another embodiment of the present invention, after transforming the relationship property having the conflict into the new relationship class, the ontology schema and mapping refiner further uses a path expression to embody an impacted sub-property relation in the ontology schema, wherein the path expression is obtained by combining relationship properties between classes the relationship property having the conflict bridges and the new relationship classes.

According to another aspect of the present invention, there is provided a method for automatically refining ontology within a specific context, comprising steps of: a) discovering a semantics relationship conflict existing between an original ontology schema and application data; and b) refining the original ontology schema based on the discovered semantics relationship conflict, and creating a new mapping between the refined ontology schema and a data schema of the application data.

In an embodiment of the present invention, a conflict existing between the original ontology schema and the application data is discovered by extracting a relationship property having a conflict with a semantic relationship in the application data in the original ontology schema, and the original ontology schema is refined by transforming the extracted relationship property having the conflict into a new relationship class.

In another embodiment of the present invention, after transforming the relationship property having the conflict into a new relationship class, a path expression is used to present an impacted sub-property relation in the ontology schema, wherein the path expression is obtained by combining relationship properties between classes the relationship property having the conflict bridges and the new relationship classes.

In a further aspect of the invention, there is provided a computer program product for automatically refining ontology within a specific context embodied in computer executable program stored in a computer accessible storage medium capable of performing the steps of the above methods.

According to the present invention, since the ontology schema is automatically refined based on contexts in the application data, users can save a lot of work of manual refinement.

In addition, according to the present invention, since a path expression is used to present an impacted sub-property relation in ontology schema, the capability of representing inheritance relations between parent property and child property in ontology schema is improved.

BRIEF INTRODUCTION TO THE DRAWINGS

The above and other objects, features and advantages of the present invention will become more apparent by describing in detail preferred embodiments of the present invention with reference to the drawings, in which.

DETAILED DESCRIPTION OF THE PREFERRED EMBODIMENTS

The present invention relates to a system and method for automatically refining ontology within context. According to the present invention, the properties between two classes in ontology schema would be checked one by one. Once found not to agree with the semantic relationships in data, they will be collected to further discover which columns in data they do rely on. After transforming all of those conflict properties into new classes and referring to their dependent columns in data as properties of the classes, we can continue to reorganize "subpropertyof" in which the object as a property is replaced with a path expression. Thus, the refined ontology schema is generated and those properties in new classes are also mapped into the corresponding data schema.

The system and method for refining ontology automatically according to the present invention will be described in detail with reference to the drawings hereinafter. It is noted that in the following we choose an RDF model as ontology representation and a relational table in a relational database as data storage for convenience of illustration. But those skilled in the art should understand that the ontology representation model and the data storage format are not limited to those. For example, the ontology representation model can further be an OWL model etc. and the data storage format can also be XML etc.

Figure 4:
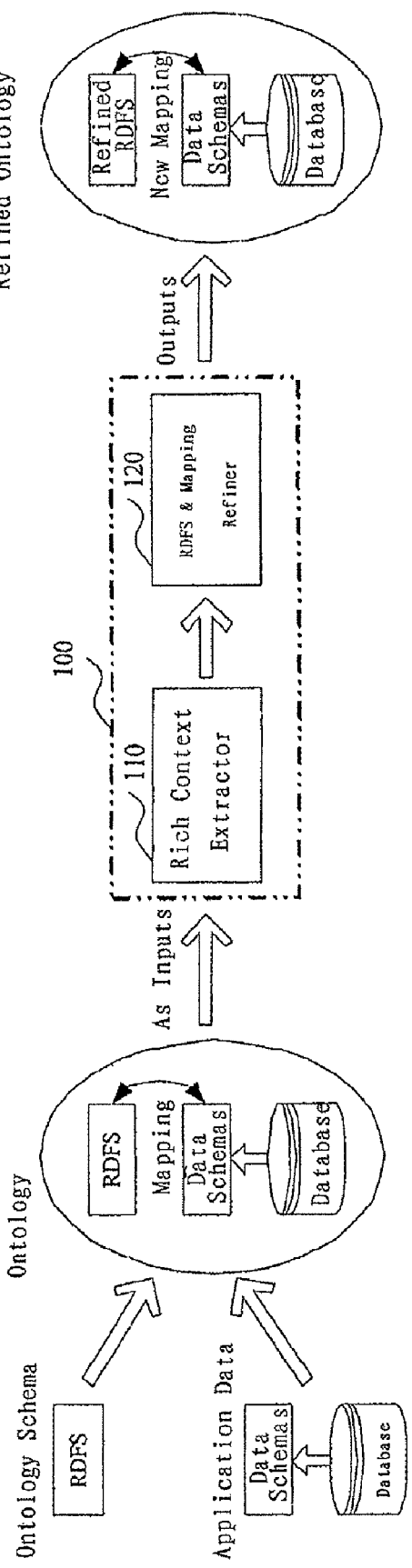
FIG. 4 shows a block diagram of a system to which the present invention is applied.

FIG. 4 shows a block diagram of a system 100 according to the present invention. As shown in FIG. 4, the system 100 according to the present invention is the rectangular part enclosed by a broken line, and the two ellipse parts are the inputs and outputs of the present system 100, respectively. By recent data integration tools, we might populate ontology schema, e.g., as the format of RDFS, with existing data, e.g., stored in a relational database, in the same domain. The general way is to build a mapping graph between RDFS and data schemas. By the system 100, the RDFS will be refined with richer context from application data and a new mapping graph between the refined RDFS and original data schemas will also be generated.

The system 100 mainly includes two functional modules, i.e. a rich context extractor 110 and an RDFS & mapping refiner 120. The rich context extractor 110 is used for discovering the kind of semantic conflict, which has been illustrated in the part of background art of the invention, existing between relationship properties in RDFS and real dependency in data. This kind of conflict embodies inability to exactly explain the semantics or rules hidden in real data only from RDFS expressiveness. The RDFS & mapping refiner 120 is used for updating the RDFS based on the results extracted before, and creating a new mapping between RDFS and data schemas.

In particular, the rich context extractor 110 is used for finding out those properties directing to other classes in RDFS, which can not fully describe the semantics in the application data. In other words, when the property has multiple values all of which are the same, ontology can not vividly distinguish them. Under the circumstance, we must reorganize the RDFS to support the functionality unless this kind of semantics might be ignored. By the rich context extractor 110, the properties in RDFS and corresponding data schemes have been collected.

The RDFS & mapping refiner 120 is mainly used to reorganize the RDFS by transforming the discovered properties into new classes with new properties extracted from the corresponding data schemas. Furthermore, the RDFS & mapping refiner 120 also builds a new mapping between the refined RDFS and original data schemas at last.

Hereinafter, the method for refining ontology automatically according to the present invention will be described in detail according to the exemplary flow chart shown in FIG. 5. Obviously, the method for refining ontology automatically according to the present invention is not limited to the exemplary method shown in FIG. 5, and those skilled in the are can design various implementations depending on specific cases according to the teaching here.

Figure 5:
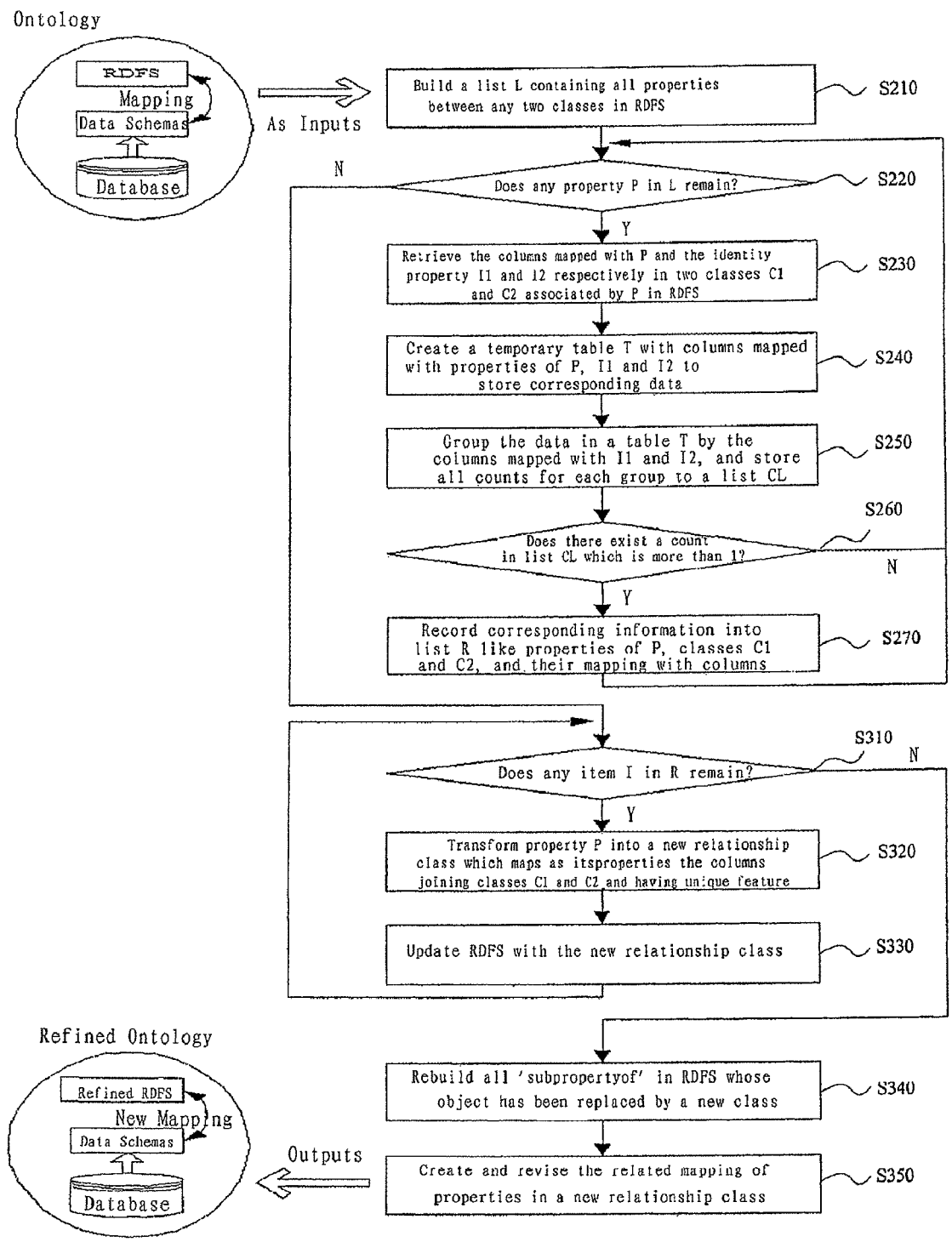
FIG. 5 shows an exemplary flow chart of the method applied in the present invention.

Referring to FIG. 5, the present exemplary method corresponds to the system 100 of FIG. 4, wherein, steps S210-S270 correspond to the procedure of the rich context extractor 110, and steps S310-S350 correspond to the procedure of the RDFS & mapping refiner 120.

The procedure of the rich context extractor 110 recursively tries to check the instance relationships occurring between two classes in which a property exists. Thus the first thing to do is to build a candidate list L in step S210, in which each item is the property bridging two classes and may be easily retrieved from RDFS. In the RDF model, the data are stored orderly as a set of triples, each of which is of "(subject, property, object)". When both "subject" and "object" are a kind of class or with class label, the "property" will be added into the list L as a candidate. After scanning the whole RDFS table, we can collect all possible candidates.

Next, in step S220, the procedure of the rich context extractor 110 enters into a loop. When the processing of list L is completed, the loop of steps S220 to S270 will be terminated. The end condition indicates that all possible candidates have been checked. Supposing that a candidate property P has been selected to check from the rest of list L, we need in step S230 to find out the corresponding column (i.e., the property field) information from the mapping table which records each mapping relation between terms described in RDFS and data schemas. The corresponding column information means that of the property P itself and the two classes P bridges. By scanning the mapping table, we can conveniently discover the corresponding columns.

In order to quickly check whether the conflict presented above does occur in the situation of current round, we need in step S240 create a temporary table T which consists of the corresponding columns discovered above. Also, the original data in different tables will be filled up to the table T with a series of joining and projecting operations. Specifically, we can further build an index on the composition of columns that are related to the identity properties in the two classes P bridges. The merit is to accelerate the job of checking the conflict.

After the data are ready in table T, the procedure will continue in step S250 to group them by the columns standing for the two classes P bridges and count the records for each group. Then in step S260, it is determined whether there exists at least a group whose count of the records is beyond one. Only while there exists at least a group whose count of the records is beyond one, we can just prove that the conflict occurs. If the condition to check the conflict is failed in the current round, the procedure will move out the property P from the list L and returns to step S220 to enter into the next round. Otherwise, it has to mark the property P in step S270 as relationship class which will be applied in the RDFS. In addition, the corresponding information with the property P will be stored into a table. Meanwhile, we will also update the list R which represents the set of relationship class to be discovered. At last, the procedure moves out the property P from the list L and returns to step S220 to enter into the next round.

By the recursive procedure of the rich context extractor 110, we can discover all conflicts occurring between varieties of property P and their corresponding data. Accordingly, we need to further embody the discoveries into ontology schema. The procedure of the RDFS & mapping refiner 120 in FIG. 5 acts as the role.

Firstly, in step S310, the procedure of the refiner 120 scans the list R, which is discovered in the first procedure and records all properties required to refine in RDFS, and check whether an item I does remain in it. Only while the list R is not empty, we will recursively take the following steps to update RDFS with relationship classes. Here, each item I in R represents a discovered property in RDFS, and is also linked with a set of columns in data schemas.

The columns appear in those tables which act as the role of joining between the two classes the property I bridges in the original RDFS. They would be the candidate set of the properties to be applied in the new relationship class. It is definitely intuitive to contain all the properties into the class. However, if there are too many columns, we still can select some of them as the properties. Under the circumstance, the columns as key in a table would be essential ones to be selected and others are optional. In step S320, after containing those properties mapped to the selected columns into the new relationship class, we can replace the property I with the new relationship class in RDFS. Note that we should also newly create two properties bridging the new class with the two older ones P bridges in the original RDFS, respectively. Then, in step S330, the original RDFS is updated with the new relationship class in the RDFS. The whole loop will not be terminated until all discovered properties in the original RDFS have been processed as above.

After the series of transformations from properties into relationship classes, the procedure will continue to update the "subpropertyof" between the properties and transformed classes in step S340. Since a part of properties in RDFS have been transformed into classes, the relation of "subpropertyof" on them will be impacted. In order to guarantee the soundness in the context of RDFS, we must apply new methods to solve the problem. Here, we rely on the idea of path expression to present the relation. That is "subpropertyof" in RDFS will occur in the two scenarios. One is traditionally done between two properties. The other is done between a property and a path expression. Simply, a path expression consists of two properties. One is from the class the transformed property depends on and the other is from the new relationship class. By composing the two properties, we can create an indirect relationship between the two classes traditionally linked by the transformed one in RDFS. In accordance with the indirect relationship, the procedure will allow the presentation of "subpropertyof" from a property to a path expression. For example, the older one is of "(subject subpropertyof object)". Both the "subject" and the "object" refer to the property in two classes. Assuming that the "object" property has been transformed into a class, it should be represented as a path expression of "object equal to path". The composition of the two properties will be the path like "node1 is propertyA" and "node2 is propertyB". Also, we must mark the containment in the path like "path has node1" and "path has node2".

By the updating for all relations of "subpropertyof", the procedure will finish the process of RDFS refinement and continue in step S350 to rebuild new mapping between RDFS terms and columns in data schemas. The part is mainly to create the new mapping for the properties generated in the above process in the new classes. The properties are automatically extracted from the columns. Their mapping actually have been recorded in the list R. Therefore, it could only copy the corresponding items in R as the mapping information for refined RDFS.

Through the two main parts of the rich context extractor 110 and the RDFS & mapping refiner 120, the procedure could generate the refined ontology just shown in the left bottom of FIG. 5.

Figure 1:
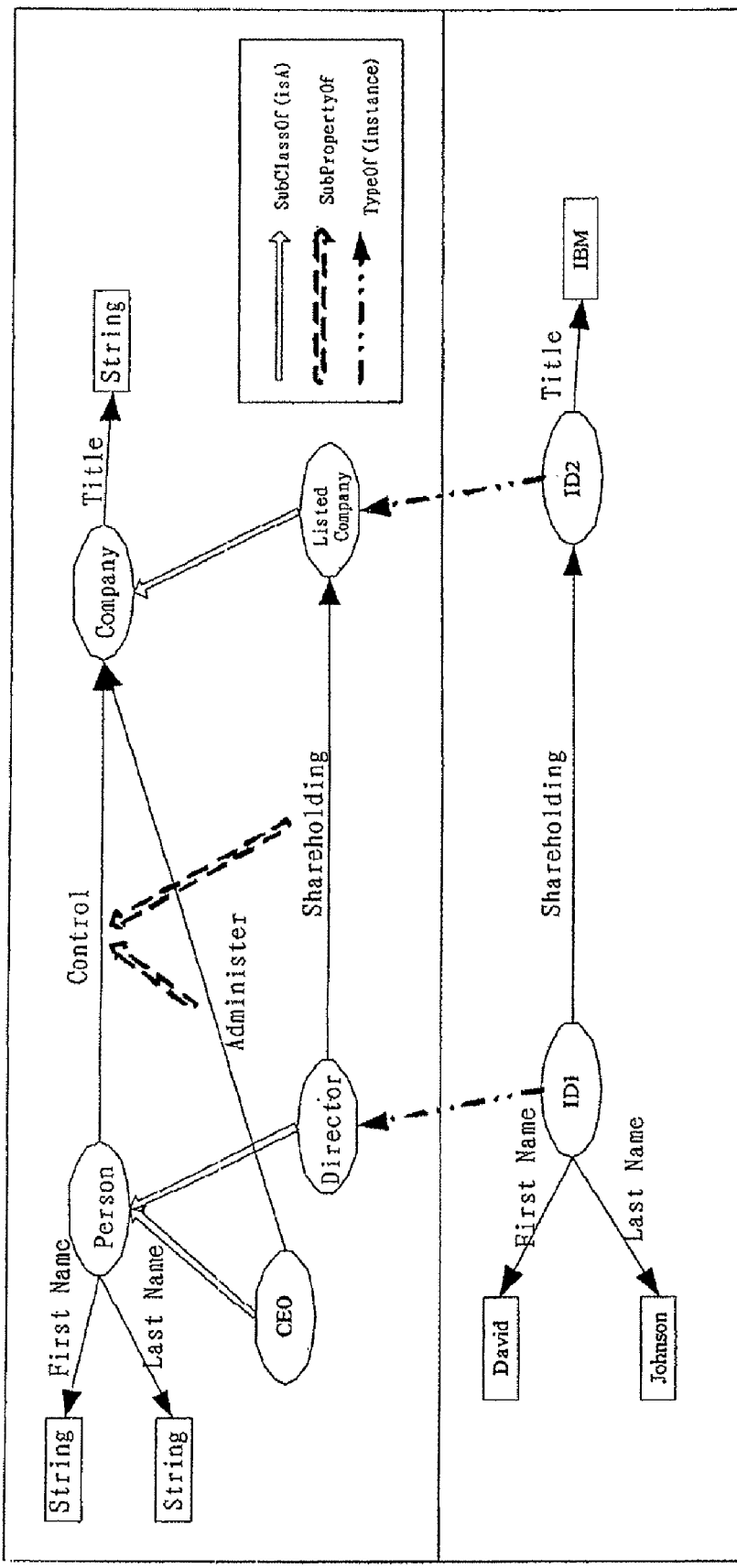
FIG. 1 shows an example of ontology predefined by experts in securities business.
Figure 2:
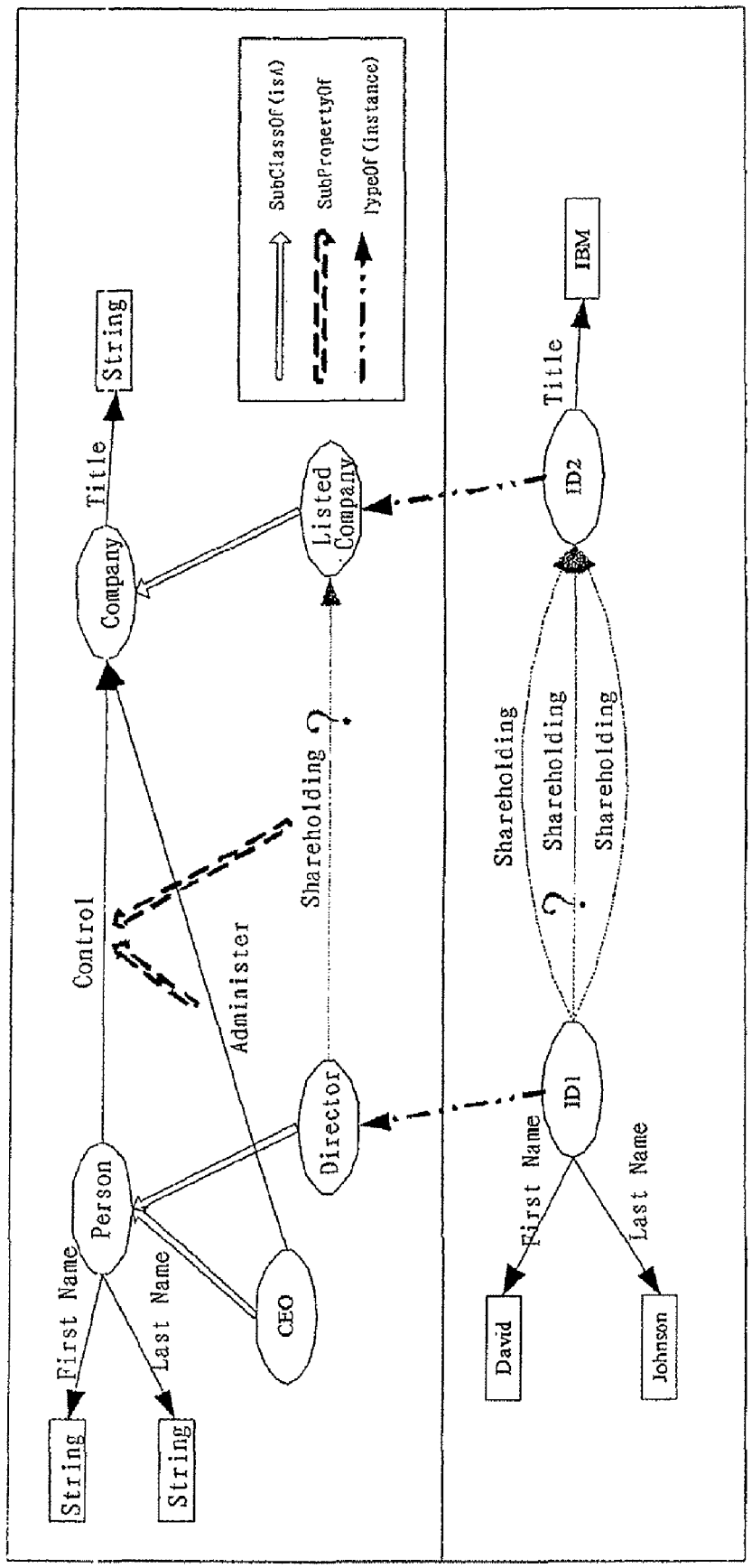
FIG. 2 shows an example of a conflict existing between the predefined ontology and data.
Figure 3:
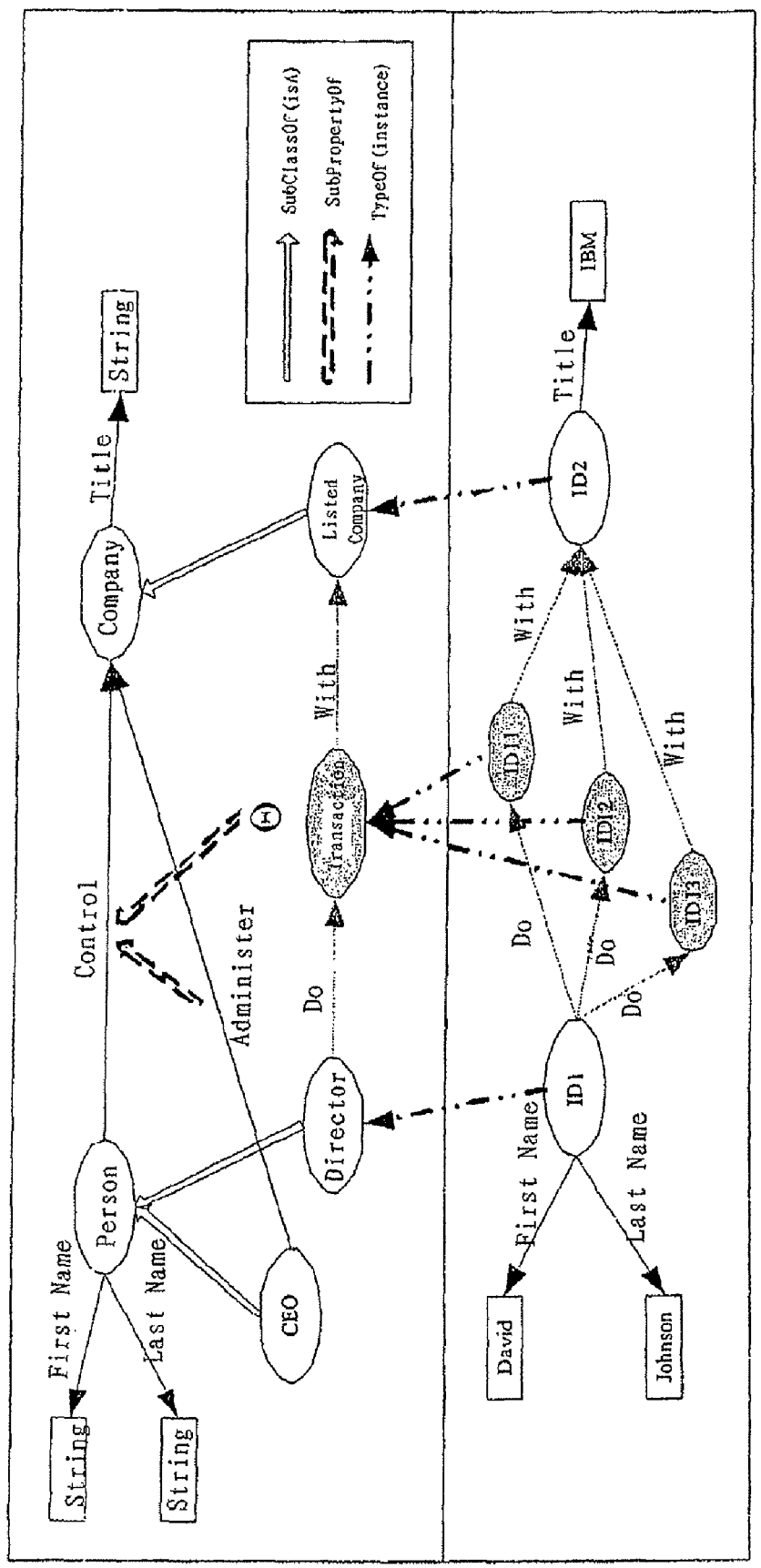
FIG. 3 shows an example of an approach for clearing the conflict according to the prior art.

For convenience to illustrate the process, we will present a scenario below as an example. FIG. 3 has described an exemplary diagram showing that the conflicts occurring between RDFS and real data would be cleared. Borrowing the part of the case, we will describe its process of the transformation and refinement on RDFS.

Figure 6:
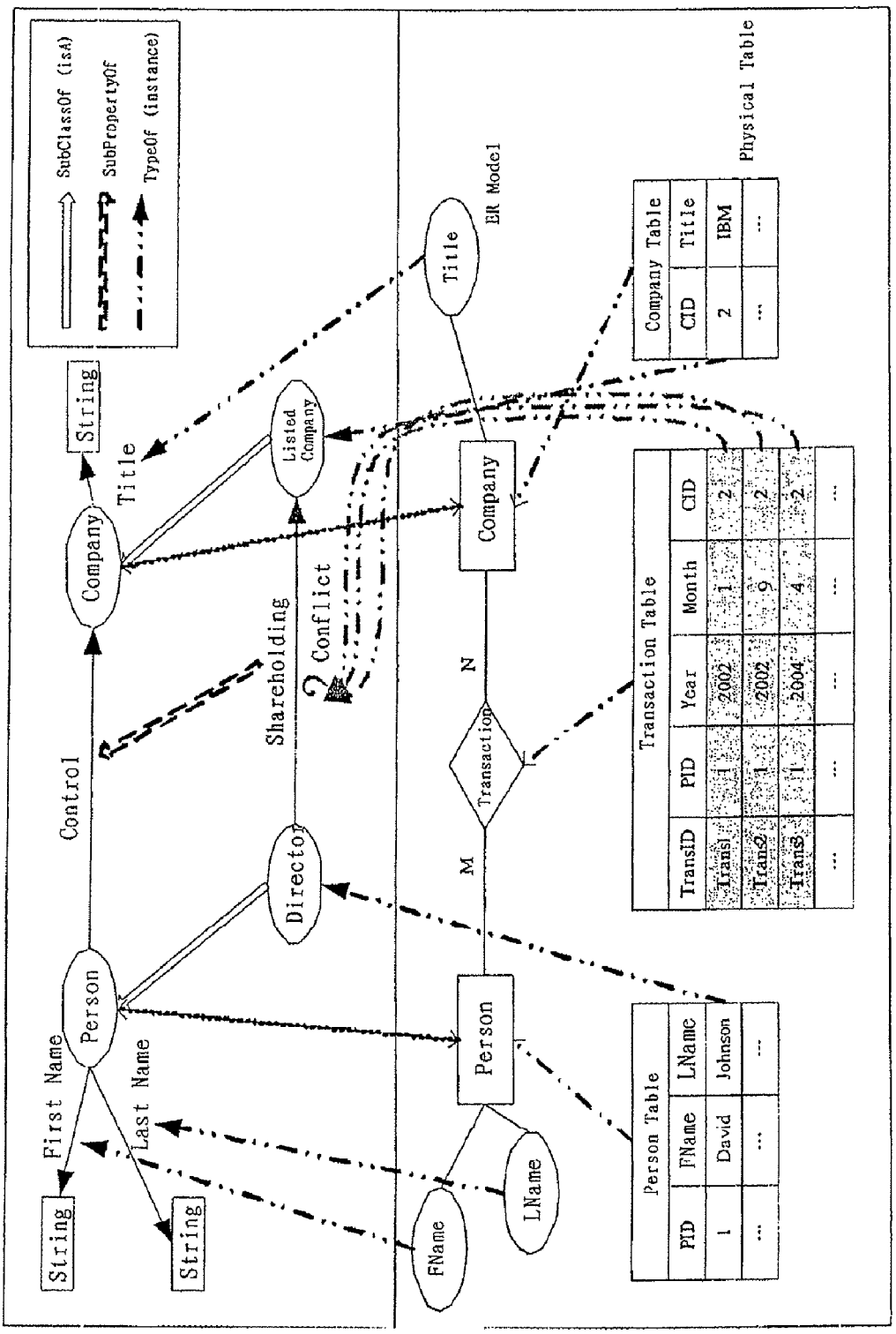
FIG. 6 shows an exemplary diagram after initial process of ontology mapping with relational data.

FIG. 6 shows the inputs of the case for the procedure of the present invention. The data have been stored in a table and its entity relationship (ER) model is also included for clarity. The mapping between the data and the ontology schema (or RDFS) has been done by a data integration tool. At first, the procedure will find out a conflict occurring between "Shareholding" relation in RDFS and the data by scanning the table of "Transaction". Here, the procedure will record the corresponding information for the further processing on the conflict.

Figure 7:
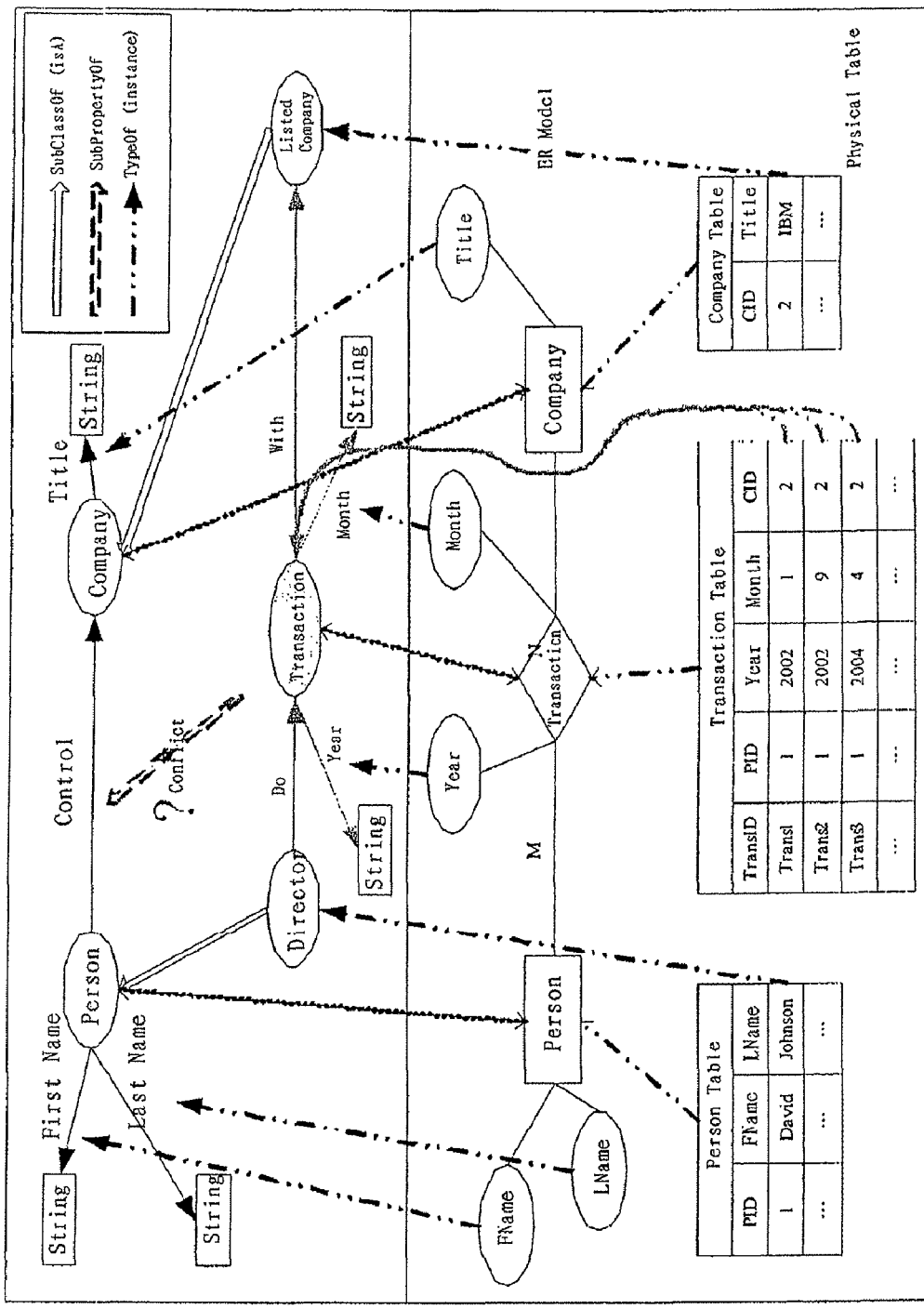
FIG. 7 shows an exemplary diagram after the process of transforming conflict property into relationship class.

After the recursive discovery on the kind of conflict, the procedure will solve them one by one. It will create a new relationship class for each conflict property. As shown in FIG. 7, the class of "Transaction" has been built and also contains two new properties of "Year" and "Month", both of which are extracted from the data columns in the table of "Transaction". Moreover, the relationships of "Do" and "With" are created to bridge the two classes of "Person" and "Company" which originally were linked by the property of "Shareholding". Here, notes that the above conflict has been cleared. Each record in the table of "Transaction" could be the instances of the class of "Transaction" in RDFS.

Since the new class has been injected into the RDFS, the original context in RDFS would possibly make no sense. For example, the property of "Shareholding" was a kind of relationship of "Control" between "Person" and "Company". While the property is transformed into the class of "Transaction", the original context will be also lost in that each of new properties of the new class of "Transaction" could not independently substitute the property of "shareholding" in semantics. Therefore, the new conflict shown in FIG. 7 must be solved in the next step.

Figure 8:
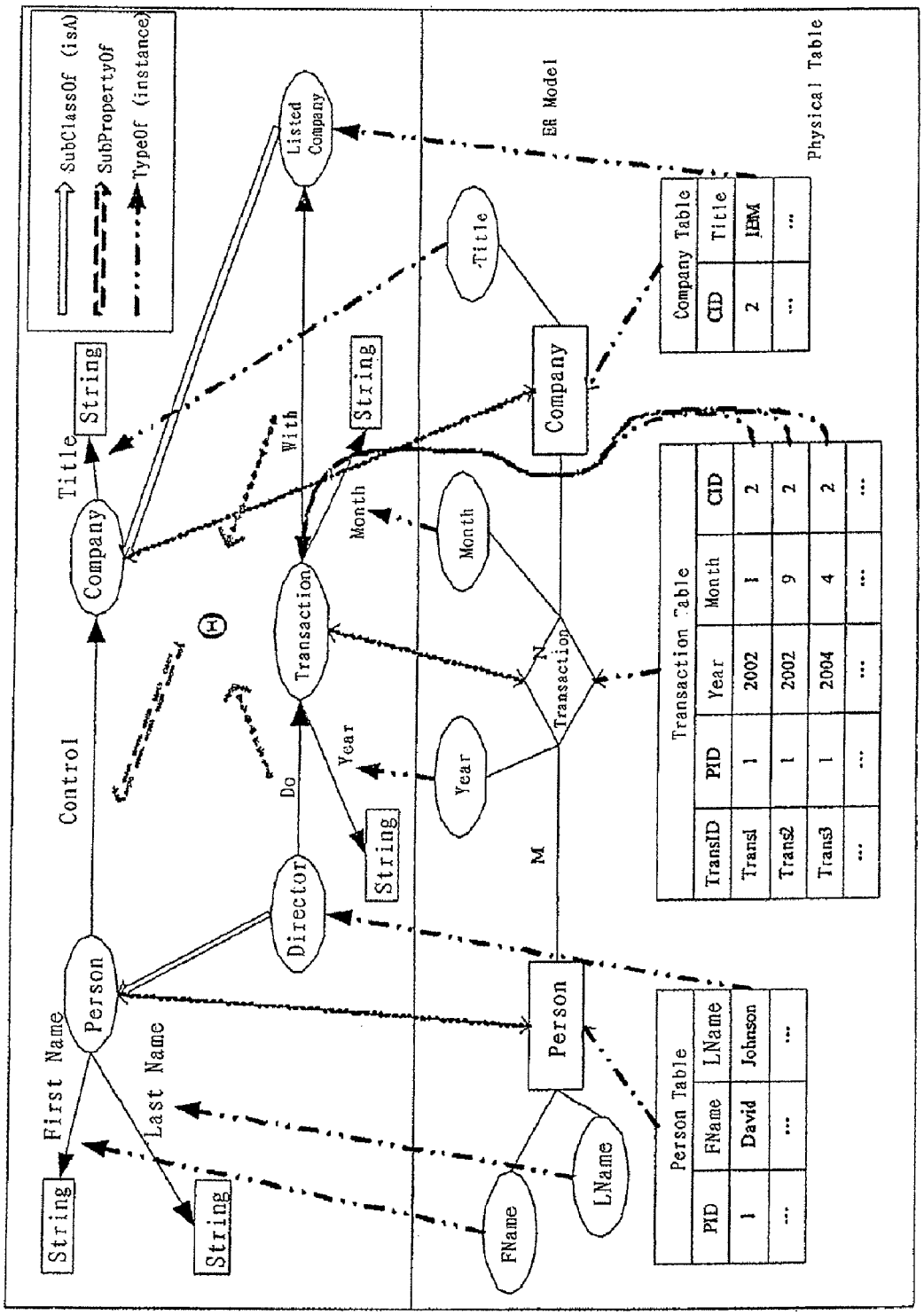
FIG. 8 shows an exemplary diagram after the process of rebuilding "subpropertyof" relation (sub-property relation) in RDFS.

To avoid the lost of semantics in RDFS, we adopt the new format of path expression into the RDF model. For example, as shown in FIG. 8, the original property of "Shareholding" could be replaced with a path from a new property of "Do" of class of "Director" into the class of "Listed Company" through a new property of "With". The properties of "Do" and "With" are mapped into the columns of "PID" and "CID" in the table of "Transaction", respectively. Borrowing the join expression among the tables of "Person", "Transaction" and "Company" based on the columns of "PID" and "CID", we can describe the internal relationship of "Shareholding" between the classes of "Director" and "Listed Company". Here, the operator of "θ" represents the path expression of the properties of "Do" and "With" in FIG. 8.

Finally, based on the refined ontology, we will build the mapping for those new properties with columns in data schemas. FIG. 3 shows the final and logic version of the ontology as outputs.

As known by those skilled in the art, the system and method for refining ontology automatically according to the present invention can be implemented by manner of software only, hardware only and/or a combination of software and the specific implementations do not limit the scope of the present invention.

In addition, the method according to the present invention is not limited to be executed according to the time sequence described in the specification, and can be executed according to the other time sequence, in parallel or independently, therefore, the execution order of the method described in the present invention does not limit the scope of the present invention either.

While the present invention has been described in detail with reference to a certain embodiment, those skilled in the art can make various modifications, alternations and variations to the embodiments of the present invention without departing from the spirit and scope of the present invention.

What is claimed is:

1. A system for automatically refining ontology within a specific context, comprising:
   a rich context extractor for discovering a semantics relationship conflict existing between an original ontology schema and application data; and
   an ontology refiner for resolving the semantics relationship conflict by transforming the original ontology schema into a refined ontology schema by transforming an original relationship property in the original ontology schema into a new relationship class in the refined ontology schema and creating at least two new relationship properties under the new relationship class based upon a portion of the data schema that caused the semantics relationship conflict to exist;
   wherein:
   the ontology refiner further resolves the semantics relationship conflict by automatically populating at least two new relationship properties under the new relationship class with data from a portion of the application data that caused the semantics relationship conflict to occur.

2. The system according to claim 1, wherein after transforming the original relationship property having the conflict into the new relationship class, the ontology refiner further uses a path expression to embody an impacted sub-property relation in the refined ontology schema, wherein the path expression is obtained by combining relationship properties between classes bridged by the new relationship property and the new relationship class.

3. The system according to claim 1, wherein the ontology refiner creates a new mapping between the refined ontology schema and the data schema of the application data by mapping the new relationship property and the new relationship class onto a portion the data schema corresponding to the resolved semantics relationship conflict.

4. The system according to claim 1, wherein a representation model of the ontology is resource description framework model or a web ontology language model.

5. The system according to claim 1, wherein the storage format of the application data is a relational table in a relational database or the eXtended Markup Language.

6. A method for automatically refining ontology within a specific context, comprising steps of:
   a) discovering a semantics relationship conflict existing between an original ontology schema and application data;
   b) transforming the original ontology schema into a refined ontology schema by transforming an original relationship property in the original ontology schema into a new relationship class in the refined ontology schema,
   c) creating at least two new relationship properties under the new relationship class based upon a portion of the data schema that caused the semantics relationship conflict to exist;
   d) creating a new mapping between the refined ontology schema and a data schema of the application data; and
   e) automatically populating at least two new relationship properties with data from a portion of the application data that caused the semantics relationship conflict to occur.

7. The method according to claim 6, further comprising the following step:
   e) creating a path expression to be used to present an impacted sub-property relation in the refined ontology schema, wherein the path expression is obtained by combining relationship properties between classes bridged by the new relationship property and the new relationship class.

8. The method according to claim 6, wherein a representation model of the ontology is resource description framework model or a web ontology language model.

9. The method according to claim 6, wherein the storage format of the application data is a relational table in a relational database or the eXtended Markup Language.

10. A system for converting application data, stored according to an application data schema, into ontologically-organized data stored according to an ontology schema, with the ontology schema including a plurality of defined relationship classes, with the ontology schema further including a plurality of defined potential relationships, with the ontologically-organized data including a plurality of relationship class instances respectively corresponding to defined relationship classes of the ontology schema, and with the ontologically-organized data further including a plurality of relationship instances respectively relating pairs of relationship class instances, the system comprising:
    a rich context extractor for automatically discovering a duplicate-relationship-instance conflict occurring between a pair of conflicted relationship class instances, the duplicate-relationship-instance conflict is considered to occur when conversion of the application data into ontologically-organized data would lead to at least two identical relationship instances between the pair of conflicted relationship class instances; and
    an ontology refiner for resolving the duplicate-relationship-instance conflict by automatically refining the ontology schema into a refined ontology schema by automatically adding a new defined relationship class to the ontology schema based upon a portion of the application data that caused the duplicate-relationship-instance conflict to occur;
    wherein:
    the ontology refiner further resolves the duplicate-relationship-instance conflict by automatically populating at least two new relationship class instances in the ontologically-organized data organized under the new defined relationship class of the refined ontology schema with data from a portion of the application data that caused the duplicate-relationship-instance conflict to occur.

11. The system of claim 10 wherein the ontology refiner further resolves the duplicate-relationship-instance conflict by automatically assigning new relationship instances between:
    the at least two new relationship instances and a first conflicted relationship class instance of the pair of conflicted relationship class instances; and
    the at least two new relationship instances and a second conflicted relationship class instance of the pair of conflicted relationship class instances.

* * * * *